United States Patent [19]

McHarg et al.

[11] Patent Number: 4,780,870
[45] Date of Patent: Oct. 25, 1988

[54] PACKET SWITCH

[75] Inventors: Christopher G. McHarg, Arlington Heights; David A. Pierce, Wheaton, both of Ill.

[73] Assignee: American Telephone and Telegraph Company, AT&T Bell Laboratories, Murray Hill, N.J.

[21] Appl. No.: 904,961

[22] Filed: Sep. 5, 1986

[51] Int. Cl.4 .......................... H04Q 11/04; H04J 3/00
[52] U.S. Cl. .......................................... 370/60; 370/86
[58] Field of Search ................... 370/60, 94, 110.1, 85, 370/86; 340/825.5, 825.05

[56] References Cited

U.S. PATENT DOCUMENTS

| | | | |
|---|---|---|---|
| 4,322,843 | 3/1982 | Beuscher et al. | 370/60 |
| 4,484,324 | 11/1984 | Orsic | 370/58 |
| 4,491,945 | 1/1985 | Turner | 370/60 |
| 4,524,440 | 6/1985 | Orsic | 370/54 |
| 4,550,397 | 10/1985 | Turner | 370/60 |
| 4,575,844 | 3/1986 | Kosuge et al. | 370/60 |
| 4,596,010 | 6/1986 | Beckner et al. | 370/60 |
| 4,638,475 | 1/1987 | Koike | 370/60 |
| 4,644,533 | 2/1987 | Braff et al. | 370/60 |

Primary Examiner—Douglas W. Olms
Assistant Examiner—Frank M. Scutch, III
Attorney, Agent, or Firm—Ross T. Watland

[57] ABSTRACT

A packet switch for switching packets received on a number of incoming packets channels to a number of outgoing packet channels. The packet switch includes a number of packet buffers each for storing packets received from an associated one of the incoming packet channels and further includes a number of selectors each permanently connected to each of the packet buffers and each associated with one of the outgoing packet channels for selectively connecting any of the packet buffers to the associated outgoing packet channel. A packet switch control mechanism responds to packets stored by the packet buffers by controlling the selective connections made by the selectors based on headers included in the stored packets. The control mechanism also responds to the stored packets by selectively effecting the transmission of the stored packets by the packet buffers.

19 Claims, 10 Drawing Sheets

PACKET SWITCH

CROSS-REFERENCE TO RELATED APPLICATIONS

This application is related to the following applications:

P. D. Hunter, W. W. Parker and B. C. Widrevitz Case application No. 904,885 filed Sept. 5, 1986, "Virtual PBX Call Processing Method", P. D. Hunter, J. M. Johnson, C. G. McHarg, D. A. Pierce, T. J. J. Starr, B. C. Widrevitz, R. A. Wilson and M. J. Zola Case application No. 904,962 filed Sept. 5, 1986, "Distributed Packet Switching System", D. L. DeBruler, E. H. Hafer, T. L. Hiller, D. A. Kimber, J. M. Johnson, C. G. McHarg, S. W. Pector and D. A. Pierce Case application No. 904,929 filed Sept. 5, 1986, "Control Information Communication Arrangement for a Distributed Control Switching System".

The related applications are filed concurrently herewith and are assigned to the assignee of the present invention.

TECHNICAL FIELD

This invention relates to packet switching arrangements and, more particularly, to the control structures associated with high capacity packet switches.

BACKGROUND OF THE INVENTION

When the techniques of packet communication are extended beyond digital data communications to other types of information transfer, e.g., voice and image communication, the packet handling capacities required of the packet network elements must necessarily be increased manifold. One example of a high capacity packet network element is the fast packet switching system disclosed in U.S. Pat. No. 4,550,397, issued to J. S. Turner et al. on Oct. 29, 1985. In the Turner system, a high packet capacity is achieved in a self-routing network comprising multiple stages of switching nodes employing variable buffering techniques to decrease the packet delay across the network. An alternate routing mechanism is used to improve the network capacity under unbalanced traffic conditions that would otherwise cause a number of routes communicating a large amount of traffic to be channeled through one node. As a consequence of the alternate routing, packets are not necessarily received at their destination in the same order they were transmitted and, in many cases, some packet reordering mechanism must be implemented at the destination. Although the Turner et al. system represents an important advance in self-routing networks, the cumulative delay of packets through the multi-stage network and the reordering of packets required when alternate network routes are used to convey order-sensitive traffic, are significant problems in many applications.

A second known approach to the problem of switching packetized information is disclosed in U.S. Pat. No. 4,524,440, issued to M. Orsic. The Orsic system is referred to as a fast circuit switching system since a separate circuit is established for each packet-sized data communication. Information is conveyed from a number of communications modules in source channels to a number of port controllers and to a network. Information is conveyed from the network to destination channels. Each communications module includes a transmitter that transmits circuit setup request signals defining destination channels and also transmits data. Each port controller stores one of a number of status words defining the availability of the destination channels and each of these status words is cycled to each port controller. When one of the status words cycled to a port controller defines an available destination channel requested by a circuit setup request signal, the port controller transmits the circuit setup request signal and subsequent data to the network. The network responds to the circuit setup request signal by establishing a circuit to the requested destination channel. The port controllers of the Orsic system use the cycled status words to advantage to control the transmission of packets by the communications modules. However, the network in the Orsic system is relatively complex because it must respond to circuit setup request signals very quickly to establish the requested circuits to destination channels, and because it must distinguish between the request signals and the packets themselves since both are conveyed in the same channel.

In view of the foregoing, a recognized problem in the art is the difficulty in achieving a high-capacity packet switch without requiring large, complicated networks and complex packet processing techniques. Ancillary deficiencies of the prior art are the cumulative delay and the need for packet reordering as in a multi-stage self-routing packet network and the network complexity attendant with distinguishing between packets and request signals conveyed in the same channel and meeting stringent network requirements in establishing circuits rapidly in response to circuit setup request signals as in the Orsic system.

SUMMARY OF THE INVENTION

The foregoing problems are solved and a technical advance is achieved in accordance with the principles of the invention in an exemplary single-stage packet switch where there are permanent connections between every incoming packet channel and each of a plurality of selectors individual to each outgoing packet channel, and where a simple control ring structure is used to selectively enable the selectors to connect incoming channels to outgoing channels in response to headers included in received packets and network state definitions conveyed on the control ring.

A packet switch in accordance with the invention is used to switch packets received on a plurality of incoming packet channels to a plurality of outgoing packet channels. The packet switch includes a number of packet buffers each for storing packets received from at least one of the incoming packet channels and further includes a number of selectors each permanently connected to each of the packet buffers and each associated with at least one of the outgoing packet channels for selectively connecting any of the packet buffers to an outgoing packet channel associated with that selector. A packet switch control mechanism responds to packets stored in the packet buffers by controlling the selective connections made by the selectors based on headers included in the stored packets.

In an exemplary embodiment of the invention, the control mechanism also responds to the stored packets by selectively effecting the transmission of the stored packets from the packet buffers. The control mechanism is a control ring comprising a number of transmit control nodes and selector control nodes and multiple conductors interconnecting the nodes for transmitting signals to the transmit control nodes and the selector control nodes defining the present connection state of ones of the packet buffers to ones of the outgoing packet channels. Each of the selector control nodes controls the selective connections made by at least one of the selectors and each of the transmit control nodes effects the transmission of packets from at least one of the packet buffers. Each transmit control node responds to a receipt by an associated packet buffer of a given packet, including a header defining a given outgoing packet channel, and to signals transmitted by the control ring conductors defining a connection state wherein none of the packet buffers is presently connected to the given outgoing packet channel, by effecting a change of the signals transmitted by the control ring conductors to define a connection state wherein the associated packet buffer is connected to the given outgoing packet channel, and by effecting the transmission of the given packet from the associated packet buffer. Each selector control node responds to signals transmitted by the control ring conductors defining a connection state wherein a given packet buffer is connected to an outgoing packet channel associated with that selector control node, by controlling the associated selector to connect the given packet buffer to that outgoing packet channel.

In the exemplary embodiment, the signals transmitted by the control ring conductors also define the availability of each of the outgoing packet channels for receiving packets. Transmit control nodes do not effect a change of the signals transmitted by the control ring conductors to define a connection to an outgoing packet channel or control the transmission of packets to the outgoing packet channel unless the signals transmitted by the control ring conductors define that outgoing packet channel as available for receiving packets.

A number of outgoing time-multiplexed links each convey multiple circuit-switched channels and at least one of the outgoing packet channels. Each of the outgoing packet channels includes an outgoing packet buffer interposed between one of the selectors and one of the outgoing time-multiplexed links for storing packets received from the selector for insertion in the outgoing packet channel on the outgoing time-multiplexed link.

BRIEF DESCRIPTION OF THE DRAWING

A more complete understanding of the present invention may be obtained by a consideration of the following description when read in conjunction with the drawing in which.

GENERAL DESCRIPTION

Figure 1:
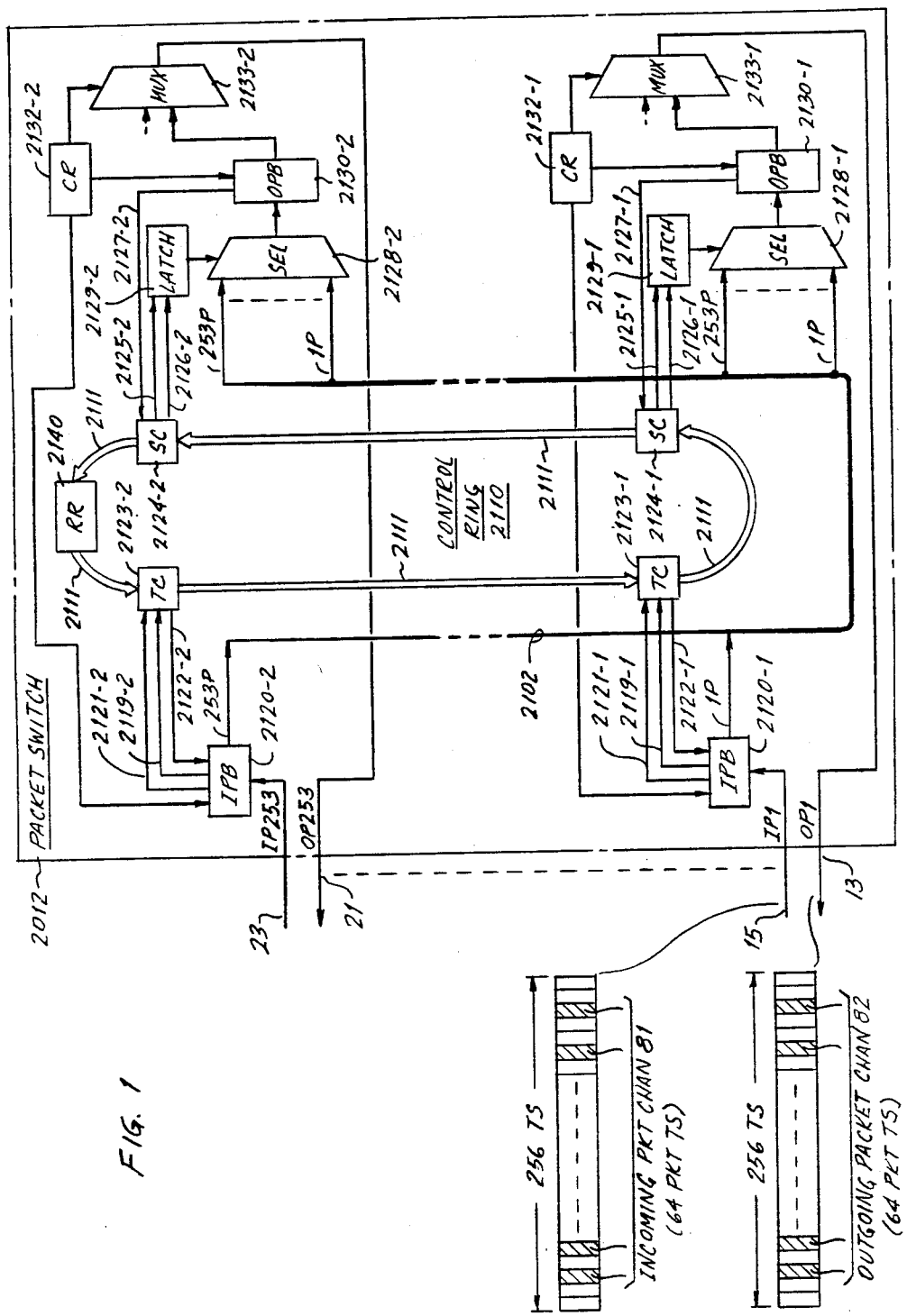
FIG. 1 is a block diagram of an exemplary embodiment of a packet switch illustrating the principles of the present invention.

FIG. 1 is a block diagram of an exemplary packet switch 2012 illustrating the principles of the present invention. Packet switch 2012 is used to switch packets received on a plurality of incoming packet channels, e.g., 81, to a plurality of outgoing packet channels, e.g., 82. The incoming packet channel 81 comprises 64 predetermined packet time slots out of 256 time slots on an incoming time-multiplexed link 15. The outgoing packet channel 82 comprises 64 predetermined packet time slots out of 256 time slots on an outgoing time-multiplexed link 13. Packet switch 2012 includes a number of incoming packet buffers, e.g., 2120-1 and 2120-2, for storing packets received from the associated incoming packet channels on incoming links, e.g., 15 and 23. Packet switch 2012 further includes a number of selectors, e.g., 2128-1 and 2128-2 each associated with one of the outgoing packet channels for selectively connecting any of the incoming packet buffers via a multi-conductor bus 2102 to the associated outgoing packet channel. A control ring 2110 comprises a number of transmit control nodes, e.g., 2123-1 and 2123-2, and selector control nodes, e.g., 2124-1 and 2124-2, and a multi-conductor bus 2111 for transmitting signals defining the present connection state of incoming packet buffers to outgoing packet channels. Each of the selector control nodes controls the selective connections made by an associated one of the selectors and each of the transmit control nodes effects the transmission of packets from an associated one of the packet buffers. Transmit control node 2123-1, for example, responds to a receipt by its associated incoming packet buffer 2120-1 of a given packet including a header defining the outgoing packet channel on link 21 and to signals transmitted by multi-conductor bus 2111 defining a connection state wherein none of the incoming packet buffers is presently connected to the outgoing packet channel on link 21, by effecting a change of the signals transmitted by bus 2111 to define a connection from incoming packet buffer 2120-1 to the outgoing packet channel on link 21. Selector control node 2124-2 responds to the signals transmitted by bus 2111 defining the connection state wherein incoming packet buffer 2120-1 is connected to the outgoing packet channel on link 21, by storing the connection definition in a latch 2129-2 to control selector 2128-2 to connect incoming packet buffer 2120-1 via conductor 1P of multi-conductor bus 2102 to the outgoing packet channel on link 21.

Each outgoing time-multiplexed link conveys multiple circuit-switched channels and one of the outgoing packet channels. Each of the outgoing packet channels includes an outgoing packet buffer interposed between one of the selectors and one of the outgoing time-multiplexed links for storing packets from the selector for insertion in the outgoing packet channel on the outgoing time-multiplexed link. For example, outgoing packet channel 82 on time-multiplexed link 13 includes outgoing packet buffer 2130-1 for storing packets from selector 2128-1. A multiplexer 2133-1 combines the packet channel from outgoing packet buffer 2130-1 with multiple circuit-switched channels (not shown) for transmission on outgoing time-multiplexed link 13.

The signals transmitted on bus 2111 also define the availability of each of the outgoing packet channels for receiving packets. For example, if outgoing packet buffer 2130-1 is unable to receive a packet, it transmits a logic zero throttle bit via conductor 2127-1 for transmission on bus 2111. Transmit control node 2123-1, for example, does not effect a change of the signals transmitted by bus 2111 to define a connection to the outgoing packet channel on link 21 or control the transmission of a packet to the outgoing packet channel on link 21 unless the signals transmitted by bus 2111 define the outgoing packet channel on link 21 as available for receiving packets.

Figure 2:
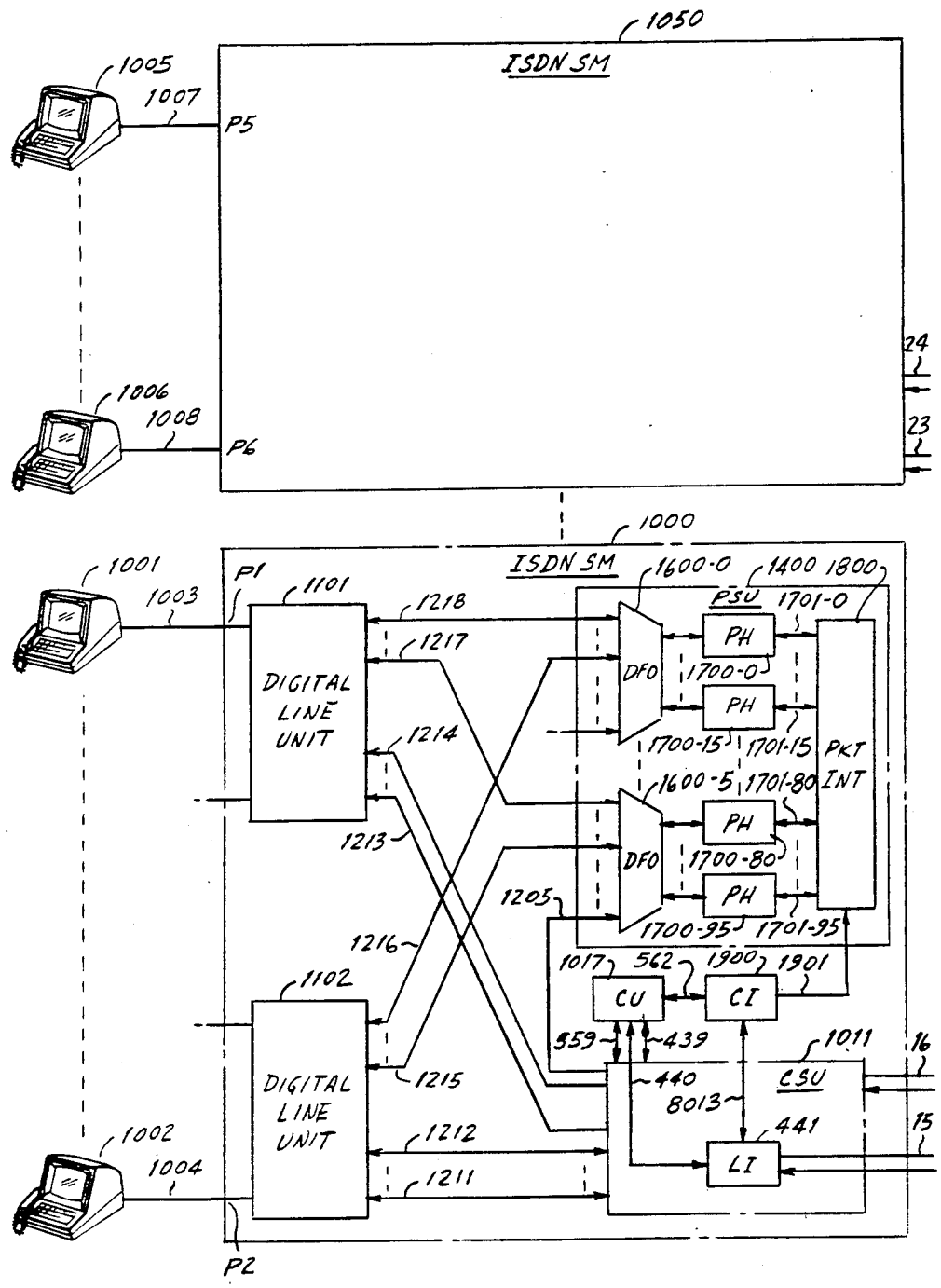
FIGS. 2 and 3, when arranged in accordance with FIG. 11, present a block diagram of an illustrative switching system employing the packet switch of FIG. 1.
Figure 3:
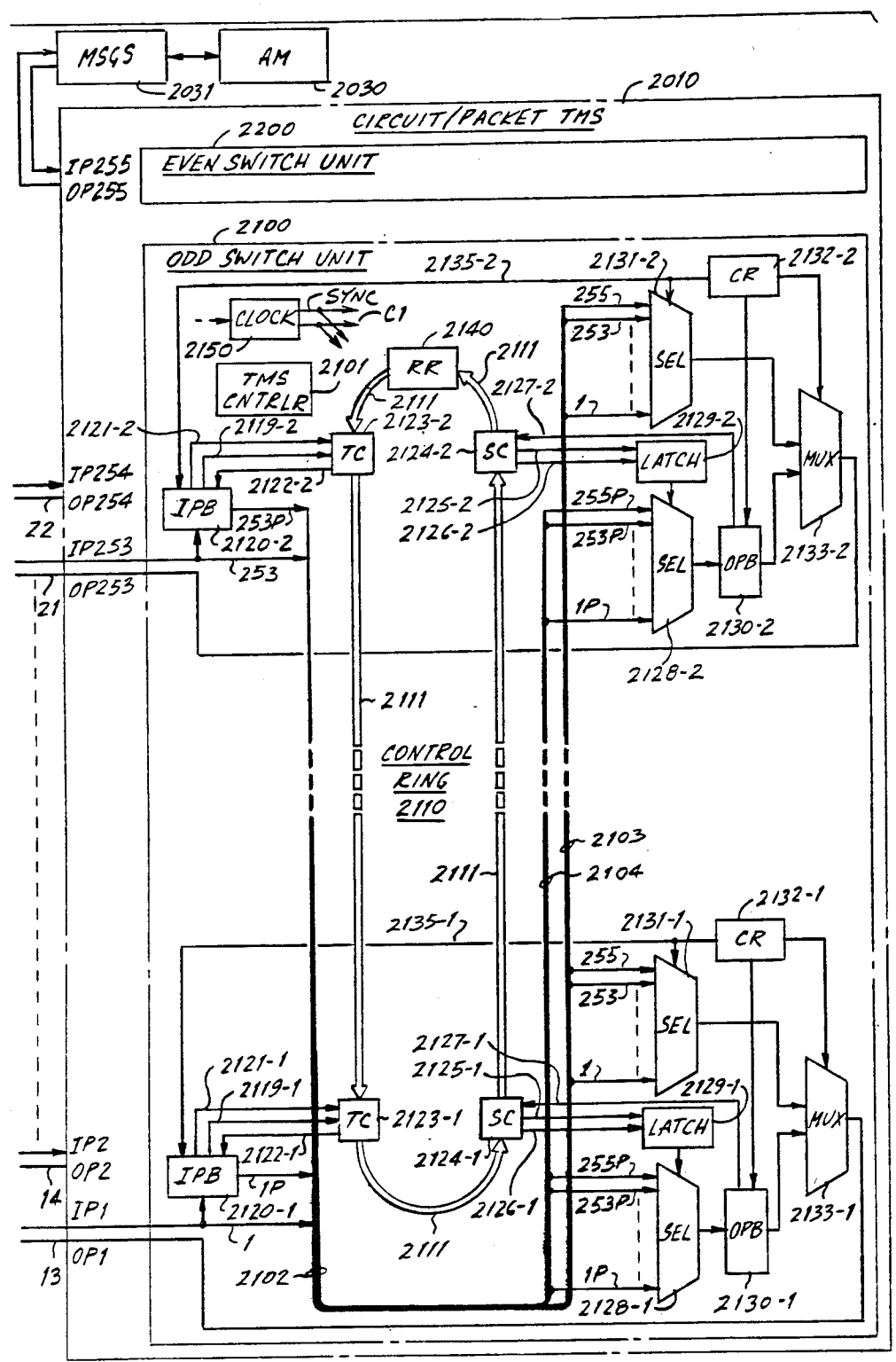

Packet switch 2012 is not separately shown in switching system 10 of FIGS. 2 and 3, but rather is shown integrated into a circuit/packet time-multiplexed switch 2010.

DETAILED DESCRIPTION

Figure 11:
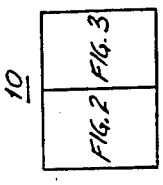

FIGS. 2 and 3, when arranged in accordance with FIG. 11, present a block diagram of the exemplary switching system 10. Switching system 10 includes a plurality of ISDN switching modules, e.g., 1000 and 1050, to provide both circuit switching and packet switching service via a plurality of access ports, e.g., P1, P2, P5 and P6, to a plurality of user stations, e.g., 1001, 1002, 1005 and 1006, representing, for example, customer teleterminals, vendor databases, telephone operator position terminals or packet access ports. The switching modules 1000 and 1050 are referred to as ISDN switching modules because they provide integrated services digital network (ISDN) capabilities. An integrated services digital network is defined as a network evolved from the telephony integrated digital network that provides end-to-end digital connectivity to support a wide range of services, including voice and non-voice services, to which users have access by a limited set of standard multipurpose customer interfaces. Each user station, e.g., 1002, transmits information to and receives information from its associated switching module, e.g., 1000, in two 64 kilobits per second channels referred to as B-channels and in one 16 kilobits per second channel referred to as a D-channel. The B-channels may be used to convey digitized voice samples at the rate of 8000, eight-bit samples per second or to convey digital data at a rate of 64 kilobits per second. Each B-channel is separately circuit-switched by switching system 10 to other user stations, e.g., 1001, 1005 or 1006. The D-channel from a user station is used both to effect message signaling between that user station and switching system 10 and to convey data packets among user stations. The D-channel is packet switched either to other user stations or to a control unit 1017 which controls the establishment of both circuit-switched calls and packet-switched calls within switching module 1000. The message signaling between user stations and control unit 1017 can be of either the functional or stimulus types. Functional signaling involves a degree of intelligent processing in its generation or analysis whereas stimulus signaling is either generated as a result of a single event at a user station, e.g., a key depression, or contains a basic instruction from switching system 10 to be executed by a user station.

In the present exemplary embodiment, information is conveyed between a user station, e.g., 1002, and switching module 1000 via a four-wire, user access line 1004 using one pair of wires for each direction of transmission. User line 1004 transmits a serial bit stream at the rate of 192 kilobits per second which comprises 144 kilobits per second for the above-mentioned two 64 kilobits per second B-channels and one 16 kilobits per second D-channel and which further comprises 48 kilobits per second used for a number of functions including framing, DC balancing, control and maintenance. User line 1004 represents what is referred to by the International Telegraph and Telephone Consultative Committee (CCITT) as the T-interface. The use of the T-interface in the present system is only exemplary. The invention is equally applicable to systems using other access methods.

In switching module 1000, the user lines, e.g., 1003 and 1004, are terminated by two digital line units 1101 and 1102. Circuit-switched information is conveyed between each of the digital line units 1101 and 1102 and a circuit switching unit 1011 via a plurality of 32-channel bidirectional data buses, e.g., 1211, 1212, 1213 and 1214. Although the data buses such as bus 1211 are used primarily to convey B-channel information which is circuit switched by circuit switching unit 1011 either to user stations served by switching module 1000 or to a circuit/packet time-multiplexed switch 2010, the data buses may also be used to convey D-channel information which is further conveyed via predetermined circuit switching unit 1011 channels and via a 32-channel bidirectional data bus 1205 to a packet switching unit 1400. Each channel or time slot on the data buses such as bus 1211 can include eight B-channel bits from one user station or two D-channel bits from each of four different user stations. Packet-switched information is conveyed between each of the digital line units 1101 and 1102 and packet switching unit 1400 via a second plurality of 32-channel bidirectional data buses, e.g., 1215, 1216, 1217 and 1218. Each channel or time slot on data buses such as 1213 or 1205 can include two D-channel bits from each of four different user stations.

In the present exemplary embodiment, packet switching unit 1400 includes 96 protocol handlers 1700-0 through 1700-95, and packet interconnect 1800 which interconnects protocol handlers 1700-0 through 1700-95 and a communication interface 1900. Access from the digital line units 1101 and 1102 to the protocol handlers 1700-0 through 1700-95 is obtained via six data fanout units 1600-0 through 1600-5, each associated with a group of 16 protocol handlers. Each user station, e.g., 1002, is associated with one of the protocol handlers 1700-0 through 1700-95, and, more particularly, with one of 32-High-level Data Link Control (HDLC) circuits (not shown) included in that associated protocol handler. In the present embodiment, communication links are established between the HDLC circuits of the protocol handlers and peer HDLC circuits (not shown) in the user stations at system initialization. These links are used to convey packets within HDLC frames in accordance with the well-known HDLC protocol.

The packets conveyed on the D-channel communication links between user stations and associated protocol handlers are, in general, of variable length. Each user station, e.g., 1002, transmits and receives packets via one or more logical links. In accordance with the present example, logical link LL0 is used to convey signaling packets to set up both circuit-switched and packet-switched calls to and frmm user station 1002 and logical link LL1 is used to convey data packets during packet-switched calls to and from user station 1002. The logical link LL1 can be further subdivided into a plurality of logical channels for use when user station 1002 is engaged in a number of simultaneous packet-switched data calls. The logical link and logical channel numbers of each packet are defined by part of a header of that packet. Each packet received by a protocol handler from a user station is stored in a random access memory (not shown) in that protocol handler. If the received packet is a signaling packet, i.e., it was received in logical link LL0, it is transmitted via packet interconnect 1800 to communication interface 1900 for subsequent transmission to control unit 1017. If the received packet is a data packet, i.e., it was received in one of the logical channels of logical link LL1, and a packet-switched call has previously been established to one of the user stations associated with switching module 1000, the data packet is transmitted via packet interconnect 1800 to the protocol handler associated with the destination user station for subsequent transmission thereto. (If the packet-switched call is established between two user stations that are associated with the same protocol handler, the data packets need not be transmitted via packet interconnect 1800. Instead the protocol handler simply transmits the data packets in the appropriate channel to the destination user station.) If a received data packet is received in a logical channel which has previously been established for use in a packet-switched call to a user station served by one of the other switching modules, e.g., user station 1006 served by switching module 1050, the data packet is transmitted via packet interconnect 1800 to communication interface 1900 for subsequent transmission via a link interface 441 included in circuit switching unit 1011 (FIG. 4), and via time-multiplexed switch 2010 to a protocol handler in switching module 1050 that is associated with the destination user station 1006.

When a given protocol handler, e.g., 1700-0, has received a complete packet from a user station and has determined the destination of that packet, i.e., either one of the other protocol handlers or communication interface 1900, it transmits a logic zero Request To Send (RTS) signal on one conductor of a six-conductor bus 1701-0 to packet interconnect 1800. Similarly, when communication interface 1900 has a packet ready for transmission to one of the protocol handlers, it transmits a logic zero RTS signal on one conductor of six-conductor bus 1901. Packet interconnect 1800 enables each of the protocol handlers and communication interface 1900 to transmit in a predetermined sequence. Since communication interface 1900 transmits signaling packets and inter-module data packets to all of the user stations served by switching module 1000, the sequence effected by packet interconnect 1800 enables communication interface 1900 sixteen times for each enabling of an individual protocol handler. When the packet interconnect 1800 sequence reaches protocol handler 1700-0, packet interconnect 1800 responds to the RTS signal on bus 1701-0 by transmitting a logic zero Clear To Send (CTS) on a second conductor of bus 1701-0 to protocol handler 1700-0. Protocol handler 1700-0 responds to the CTS signal by transmitting its stored packet at a high rate, e.g., 10 megabits per second, via packet interconnect 1800 to its destination. All of the protocol handlers and communication interface 1900 can receive the packet, but in the present embodiment, typically only one destination as defined by the packet header actually stores the packet for subsequent transmission. Only after the complete packet has been transmitted by protocol handler 1700-0, does the packet interconnect 1800 sequence resume. The receipt of the packet by the destination protocol handler or by communication interface 1900 is acknowledged by the transmission of an acknowledgment packet back to protocol handler 1700-0.

U.S. Pat. No. 4,596,010, issued to M. W. Beckner et al. on June 17, 1986, is incorporated by reference herein. The incorporated U.S. Pat. No. 4,596,010 describes packet switching unit 1400 and digital line unit 1101 in greater detail.

Figure 4:
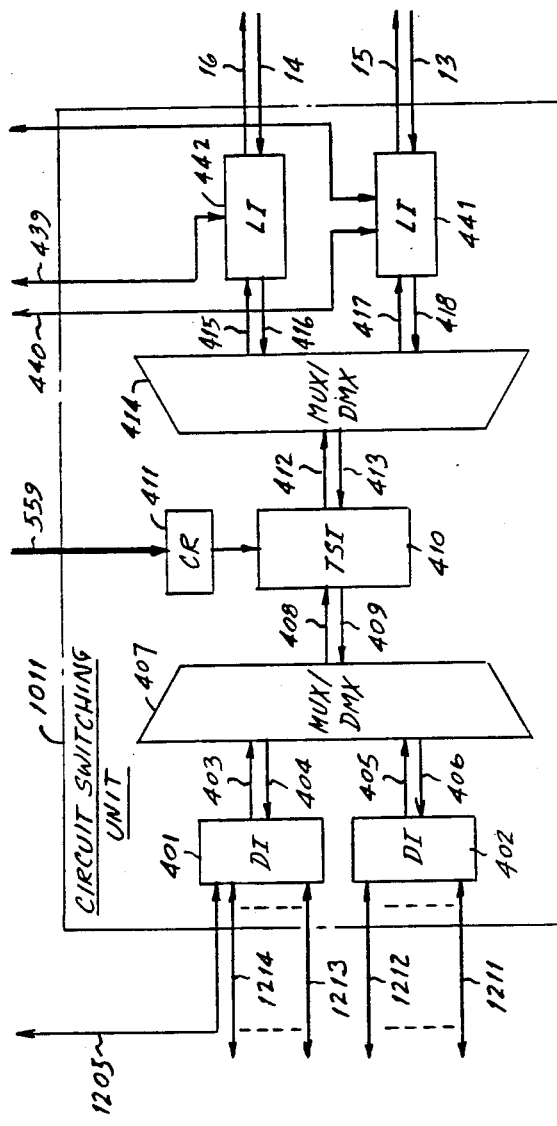
FIGS. 4 and 5 are diagrams of a circuit switching unit and an associated control unit included in the system of FIGS. 2 and 3.

Circuit-switching unit 1011 is shown in greater detail in FIG. 4. Incoming information is received on the 32-channel bidirectional data buses such as buses 1211 and 1212 from digital line unit 1102, buses 1213 and 1214 from digital line unit 1101, and bus 1205 from packet switching unit 1400. A pair of data interfaces 401 and 402 multiplex the received information onto a pair of 256-multiplex channel time-multiplexed lines 403 and 405. A multiplexer/demultiplexer 407 further multiplexes the two 256-channel lines 403 and 405 onto a single 512-channel time-multiplexed line 408 for transmission to a time-slot interchanger 410. Time-slot interchanger 410 performs the circuit switching function of interchanging the order of time slots in accordance with instructions read from a control random access memory (RAM) 411. The reordered time slots are transmitted on a 512-channel time-multiplexed line 412 to a multiplexer/demultiplexer 414, which demultiplexes the 512 channels onto two 256-channel time-multiplexed lines 415 and 417. Lines 415 and 417 are received by a pair of link interfaces 441 and 442, which perform synchronizing and signal conditioning functions and then transmit the 256 channels received on each of the lines 415 and 417, to time-multiplexed switch 2010 via 256-channel incoming links 15 and 16.

In the reverse direction, time-multiplexed switch 2010 transmits information on two 256-channel outgoing links 13 and 14 to link interfaces 441 and 442. The 256 channels from each of the links 13 and 14 are then transmitted by link interfaces 441 and 442 on two 256-channel time-multiplexed lines 418 and 416 to multiplexer/demultiplexer 414 which multiplexes the information onto a single 512-channel time-multiplexed line 413 to time-slot interchanger 410. Time-slot interchanger 410 reorders the received time slots in accordance with instructions read from control RAM 411, and transmits the reordered time slots on a 512-channel time-multiplexed line 409 to multiplexer/demultiplexer 407. Multiplexer/demultiplexer 407 demultiplexes the 512 channels onto two 256-channel time-multiplexed lines 404 and 406 to the data interfaces 401 and 402, which further demultiplex the information onto the 32-channel data buses such as 1211, 1212, 1213, 1214 and 1205.

Circuit/packet time-multiplexed switch (TMS) 2010 (FIG. 3) operates to provide inter-module connections for both circuit-switched and packet-switched calls as well as for conveying inter-module control packets between the control units of the switching modules, e.g., between control unit 1017 of switching module 1000 and a corresponding control unit in switching module 1050. The following description pertains to the operation of TMS 2010 in providing inter-module connections for circuit-switched calls. TMS 2010 includes a time-shared space division switch which operates in frames of 256 time slots or channels of approximately 488 nanoseconds each to complete paths from its input ports IP1 through IP255 to its output ports OP1 through OP255. Each switching module is connected to two input ports and two output ports. For example, switching module 1000 is connected via 256-channel incoming links 15 and 16 to input ports IP1 and IP2 and via 256-channel outgoing links 13 and 14 from output ports OP1 and OP2. TMS 2010 comprises two substantially identical switch units, odd switch unit 2100 and even switch unit 2200. Within odd switch unit 2100, conductors from every input port, e.g., conductor 1 from input port IP1 and conductor 253 from input port IP253, are combined into a multi-conductor E-bus 2102, and are coupled via bus portion 2103 to 128 input terminals of each of 128 selectors asociated with the 128 output ports OP1 through OP255 of odd switch unit 2100. Only selector 2131-1 associated with output port OP1 and selector 2131-2 associated with output port OP253 are shown in FIG. 3. Selector 2131-1, for example, operates in response to instructions stored in a control RAM 2132-1 to connect different ones of its input terminals to a multiplexer 2133-1 during each of the 256 time slots of each frame. The output terminal of multiplexer 2133-1 is connected to output port OP1. As part of the process of establishing a conventional circuit-switched call from user station 1002 to user station 1006, for example, a time slot is selected that is available both to connect input port IP1 to output port OP253 and to connect input port IP253 to output port OP1. Assume that time slot TS43 is selected. As part of the establishment of the call, a TMS controller 2101 writes instructions via a control bus (not shown) into the control RAMs 2132-1 and 2132-2. The instructions written into control RAM 2132-1 define that during time slot TS43, conductor 253 is to be selected by selector 2131-1 for connection to output port OP1. The instructions written into control RAM 2132-2 define that during time slot TS43, conductor 1 is to be selected by selector 2131-2 for connection to output port OP253.

Figure 5:
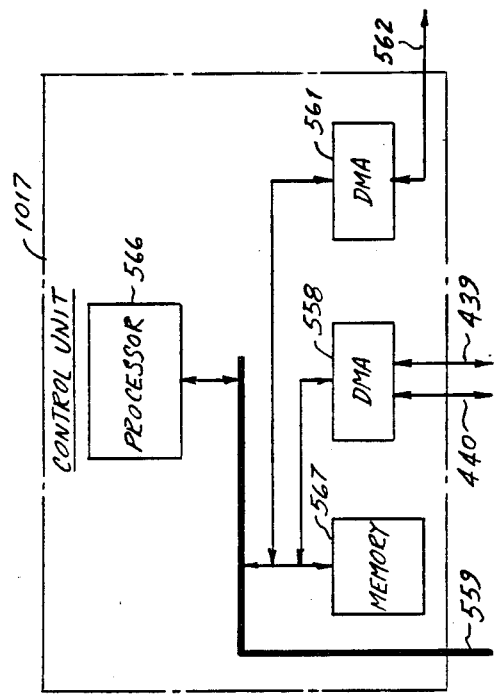

One time slot on each link between a switching module and TMS 2010 is reserved for control communications between the switching module control units and an administrative module 2030 which represents the central control of switching system 10. For example, time slot TS1 is the reserved control time slot on link 15 to input port IP1 and on link 13 from output port OP1. During time slot TS1, input port IP1 is always connected to output port OP255 and input port IP255 is always connected to output port OP1. Time slot TS2 is the reserved control time slot on link 16 to input port IP2 and on link 14 from output port OP2. During time slot TS2, input port IP2 is always connected to output port OP255 and input port IP255 is always connected to output port OP2. Similarly, the links to and from each of the other input/output port pairs have unique reserved control time slots. Control messages are generated by processor 566 (FIG. 5) within control unit 1017 and stored in a memory 567. A control message for administrative module 2030 is transmitted from memory 567 via a direct memory access (DMA) unit 558 and path 440 to link interface 441 where the message is inserted in six-bit segments into repetitions of time slot TS1 on incoming link 15 to input port IP1. During each occurrence of time slot TS1, input port IP1 is connected to output port OP255 and the six-bit segments of the control message are conveyed via output port OP255 to a message switch 2031 which accumulates the bits of the control message and then forwards the complete message on to administrative module 2030. Similarly control messages from administrative module 2030 to control unit 1017 are transmitted via message switch 2031, input port IP255, output port OP1 and outgoing link 13 to link interface 441 where the six-bit segments are extracted from time slot TS1 and conveyed via path 440 and DMA unit 558 to memory 567 within control unit 1017.

In addition to providing inter-module circuit-switched connections, TMS 2010 also provides inter-module packet-switched connections, for conveying both inter-module data packets for calls between user stations on different switching modules and inter-module control packets between the control units of different switching modules. In the present example, 64 of the 256 time slots on each incoming and outgoing link connected to the odd input and output ports of TMS 2010 are collectively used as a packet channel between communication interface 1900 and TMS 2010. The 64 time slots, referred to herein as the packet time slots, each include 12 bits of a packet. Thus the bit rate of the packet channel on incoming link 15 to input port IP1 and the packet channel on outgoing link 13 from output port OP1 is 6.144 megabits per second. The single packet channel between a switching module and TMS 2010 is used to provide packet communication to and from a family of processors on that switching module. For example, in switching module 1000, the family of processors comprises control unit 1017 and the protocol handlers 1700-0 through 1700-95. Inter-module packets each include as part of their headers an address field comprising a module subfield defining the destination switching module and a processor subfield defining the particular destination processor on that switching module. Communication interface 1900 (FIG. 2) operates to combine inter-module data packets received from packet switching unit 1400 with inter-module control packets received from control unit 1017, for transmission to link interface 441 for insertion on the 6.144 megabits per second packet channel on link 15 to input port IP1. Similarly, packets received by link interface 441 on the 6.144 megabits per second packet channel on link 13 from output port OP1, are transmitted to communication interface 1900, for separation based on the processor subfield and subsequent transmission to control unit 1017 or packet switching unit 1400. The functions of inserting and extracting the packet time slots forming the packet channels are carried out in link interface 441 in accordance with packet time slot definitions stored in a control RAM (not shown).

Figure 10:
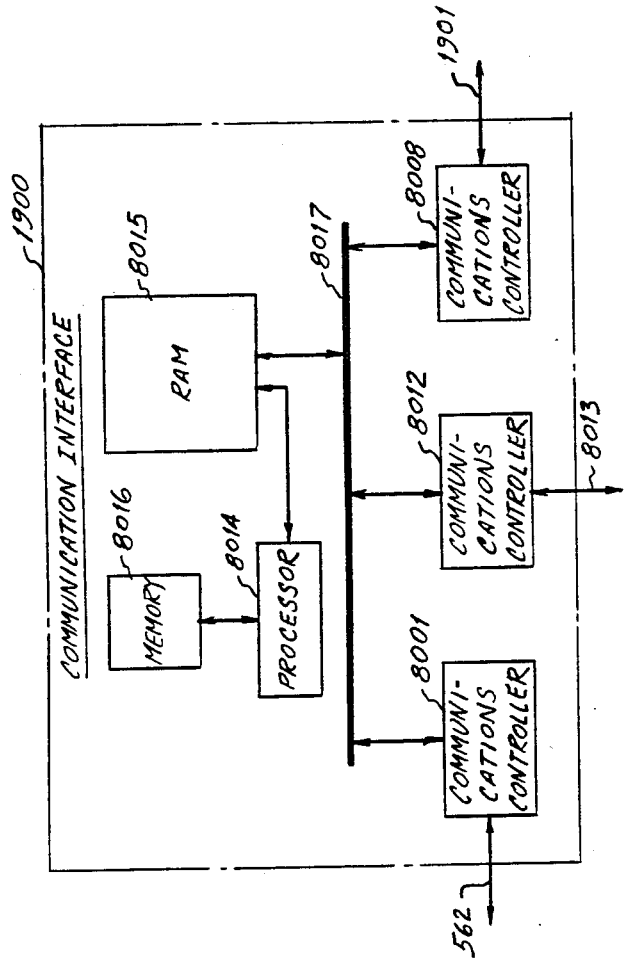
FIG. 10 is a diagram of a communication interface used to convey inter-module control packets, user information packets and access signaling packets in the system of FIGS. 2 and 3.

Communication interface 1900 (FIG. 10) includes three communications controllers 8001, 8008, and 8012 to coordinate communication between communication interface 1900 and control unit 1017, packet switching unit 1400, and link interface 441, respectively. The communications controllers 8001, 8008, and 8012 may be implemented using, for example, the Intel 82586 controller. Communication interface 1900 further includes a dual port, random access memory (RAM) 8015, which may be implemented, for example, as 22 memories each having 256K, one-bit locations. RAM 8015 is used for the intermediate storage of packets being conveyed among communication controllers 8001, 8008, and 8012, which are connected via a bus 8017 to one port of RAM 8015. A processor 8014, operating under instructions stored in a memory 8016, is connected to a second port of RAM 8015 and performs protocol processing of inter-module control packets and user signaling packets as an intermediate step in the transfer of such packets. RAM 8015 has four sections each comprising a sequence of contiguous locations used for the intermediate storage of packets in a first-in-first-out manner for a destination associated with that section.

The four sections are associated with controllers 8001, 8008, 8012, and processor 8014.

Within control unit 1017, processor 566 (FIG. 5) generates inter-module control packets and stores such packets in memory 567. The address field of an inter-module control packet includes a module subfield defining the destination switching module and a processor subfield defining the control unit in the destination switching module. A DMA unit 561 transmits the packets from memory 567 via a path 562 to communications controller 8001 which subsequently stores each received packet in the RAM 8015 section associated with processor 8014. Processor 8014 reads such packets from RAM 8015, performs necessary inter-module control packet processing, and determines based on the module subfield defining a destination switching module other than switching module 1000, that a received packet is to be transmitted to controller 8012. Accordingly, processor 8014 stores the packet in the memory 8015 section associated with controller 8012. The packet is subsequently read by controller 8012 and transmitted to link interface 441 for insertion in the 6.144 megabits per second packet channel on incoming link 15 to input port IP1. Processor 566 may also generate packets to be transmitted to the protocol handlers 1700-0 through 1700-95. In that case, the module subfield of the packet defines switching module 1000 and the processor subfield defines the particular one of the protocol handlers which is to receive the packet. Such packets are transmitted to the RAM 8015 section associated with controller 8008. Controller 8008 reads the packets from RAM 8015 and transmits them via bus 1901 and packet interconnect 1800 to the particular destination protocol handler.

In addition to control unit 1017, each of the protocol handlers 1700-0 through 1700-95 can transmit packets via communication interface 1900 and link interface 441 on the 6.144 megabits per second packet channel on incoming link 15 to input port IP1. Signaling packets received by a protocol handler from a user station will be transmitted by that protocol handler to communication interface 1900 with a module subfield defining switching module 1000 and a processor subfield defining control unit 1017. As part of the process of establishing a packet-switched data call, for example, between user station 1002 on switching module 1000 and user station 1006 on switching module 1050, the protocol handler associated with user station 1002, e.g., protocol handler 1700-0, will determine which protocol handler in switching module 1050 is associated with user station 1006. Protocol handler 1700-0 stores such information in a routing table such that data packets received thereafter from user station 1002 in the particular logical channel being used for the call, are transmitted by protocol handler 1700-0 via packet interconnect 1800 to communication interface 1900 with a module subfield defining switching module 1050 and a processor subfield defining the protocol handler associated with user station 1006. Both user signaling packets and user information packets are received by communications controller 8008 from packet interconnect 1800 via bus 1901. Communications controller 8008 subsequently stores user signaling packets in the RAM 8015 section associated with processor 8014. Processor 8014 performs necessary protocol processing on the user signaling packets and then stores them in the RAM 8015 section associated with communications controller 8001. The packets are subsequently read by controller 8001 from RAM 8015 and transmitted via path 562 and DMA unit 561 to memory 567. Communications controller 8008 stores user information packets received from packet interconnect 1800 in the RAM 8015 section associated with communications controller 8012. Controller 8012 then reads the packets from RAM 8015 and transmits them to link interface 441 for insertion in the 6.144 megabits per second packet channel on incoming link 15 to input port IP1.

Packets received on the 6.144 megabits per second packet channel on outgoing link 13 from output port OP1, are extracted from the 64 predetermined packet time slots by link interface 441 and are conveyed via path 8013 to communications controller 8012, which subsequently stores received inter-module control packets in the RAM 8015 section associated with processor 8014. Processor 8014 subsequently performs protocol processing on such inter-module control packets and then stores them in the RAM 8015 section associated with communications controller 8001. Controller 8001 reads the packets and effects their transfer via path 562 and DMA unit 561 to memory 567. Communications controller 8012 stores user information packets received from link interface 441 in the RAM 8015 section associated with communications controller 8008. Controller 8008 subsequently reads them and effects their transmission via bus 1901 and packet interconnect 1800 to the appropriate destination protocol handlers.

Within TMS 2010 (FIG. 3), the information in the 64 packet time slots received on incoming link 15 at input port IP1 is stored in an incoming packet buffer 2120-1. The definitions of the time slots on incoming link 15 that are packet time slots are stored in control RAM 2132-1 at system initialization by TMS controller 2101. Such definitions are then conveyed from control RAM 2132-1 to incoming packet buffer 2120-1 such that the proper time slots from link 15 are extracted. Each input port has a similar associated incoming packet buffer. For example, input port IP253 has associated incoming packet buffer 2120-2. The output conductors from every incoming packet buffer, e.g., conductor 1P from incoming packet buffer 2120-1 and conductor 253P from incoming packet buffer 2120-2, are combined into multi-conductor E-bus 2102, and are coupled via bus portion 2104 to 128 input terminals of each of 128 selectors associated with the 128 output ports OP1 through OP255 of odd switch unit 2100. Only selector 2128-1 associated with output port OP1 and selector 2128-2 associated with output port OP253 are shown in FIG. 3. The transmission of packets from incoming packet buffers, e.g., 2120-1 and 2120-2, and the selection of input conductors by the selectors, e.g., 2128-1 and 2128-2, are controlled by a control ring 2110 interconnecting a plurality of transmit control nodes, e.g., 2123-1 and 2123-2, a plurality of selector control nodes, e.g., 2124-1 and 2124-2, and a ring repeater 2140. Control ring 2110 includes an eight-conductor bus 2111 comprising a seven-bit status bus and a single throttle bit. The status bus is used to define the status of the selectors, e.g., 2128-1 and 2128-2, as to whether they are presently being used to convey a packet or not. The status bus defines the status of each of the 128 selectors by a sequence of 128 status words repetitively transmitted around ring 2110. A status word comprising seven logic zeroes (0000000) defines that the selector is presently idle, i.e., it is not conveying a packet. A nonzero status word defines that the selector is presently conveying a packet and the particular seven-bit status word defines which of the 128 incoming packet buffers is presently transmitting a packet to that selector. The ring cycle of 128 status words repeats 32 times during each 125-microsecond frame. Assume that a packet has been received by incoming packet buffer 2120-1 and that the module subfield of the packet address defines that the packet is destined for switching module 1050. Incoming packet buffer 2120-1 transmits a signal, referred to herein as a packet present signal, on a conductor 2119-1 to transmit control node 2123-1. Incoming packet buffer 2120-1 also transmits a request pulse on a conductor 2121-1 to transmit control node 2123-1 coincident with the arrival of the status word defining the status of selector 2128-2. If that status word is 0000000 defining that selector 2128-2 is presently idle, transmit control node 2123-1 substitutes a nonzero status word 0000001 defining input port IP1, or equivalently switching module 1000. When selector control node 2124-2 subsequently receives the nonzero status word 0000001 at the time associated with selector 2128-2, node 2124-2 transmits the status word 0000001 via a path 2126-2 for storage in a latch 2129-2. The storage in latch 2129-2 is effected by the transmission of a strobe pulse from selector control node 2124-2 via a conductor 2125-2 to latch 2129-2. The contents of latch 2129-2 define which of the 128 input terminals is selected by selector 2128-2 for connection to an outgoing packet buffer 2130-2. The status word 0000001 in latch 2129-2 defines that selector 2128-2 is to connect conductor 1P to outgoing packet buffer 2130-2. Transmit control node 2123-1 subsequently transmits a go signal via a conductor 2122-1 to incoming packet buffer 2120-1. The go signal is transmitted by transmit control node 2123-1 at least one ring cycle after the request signal was received from incoming packet buffer 2120-1 in order to assure that selector 2128-2 has been appropriately set. In response to the go signal, incoming packet buffer 2120-1 transmits the received packet via conductor 1P of E-bus 2102 and selector 2128-2 to outgoing packet buffer 2130-2. Control RAM 2132-2 controls the operation of a multiplexer 2133-2 to combine circuit-switched information from selector 2131-2 and packet-switched information from outgoing packet buffer 2130-2 onto the single 256-channel time-multiplexed link 21 from output port OP253. During each of the 64 predetermined packet time slots, outgoing packet buffer 2130-2 transmits a 12-bit segment of the stored packet via multiplexer 2133-2 to output port OP253 for transmission to switching module 1050. During the remaining time slots, the circuit-switched information from selector 2131-2 is transmitted via multiplexer 2133-2 to output port OP253 for transmission to switching module 1050.

Once the complete packet is transmitted by incoming packet buffer 2120-1, it removes the packet present signal from conductor 2119-1. In response to such removal, transmit control node 2123-1 substitutes the idle status word 0000000 for the status word 0000001 defining the status of selector 2128-2.

Even if the selector 2128-2 is idle at a particular time such that the status word 0000000 is present at the appropriate point of each ring cycle, the outgoing packet buffer 2130-2 may not be ready to receive a packet. If not, outgoing packet buffer 2130-2 transmits a logic zero throttle bit via a conductor 2127-2 to selector control node 2124-2. The logic zero throttle bit is inserted on control ring 2110 by selector control node 2124-2, at the same point in the ring cycle that the status word associated with selector 2128-2 is transmitted. The logic zero throttle bit prevents any of the transmit control nodes from effecting the transmission of a packet to selector 2128-2.

Figure 9:
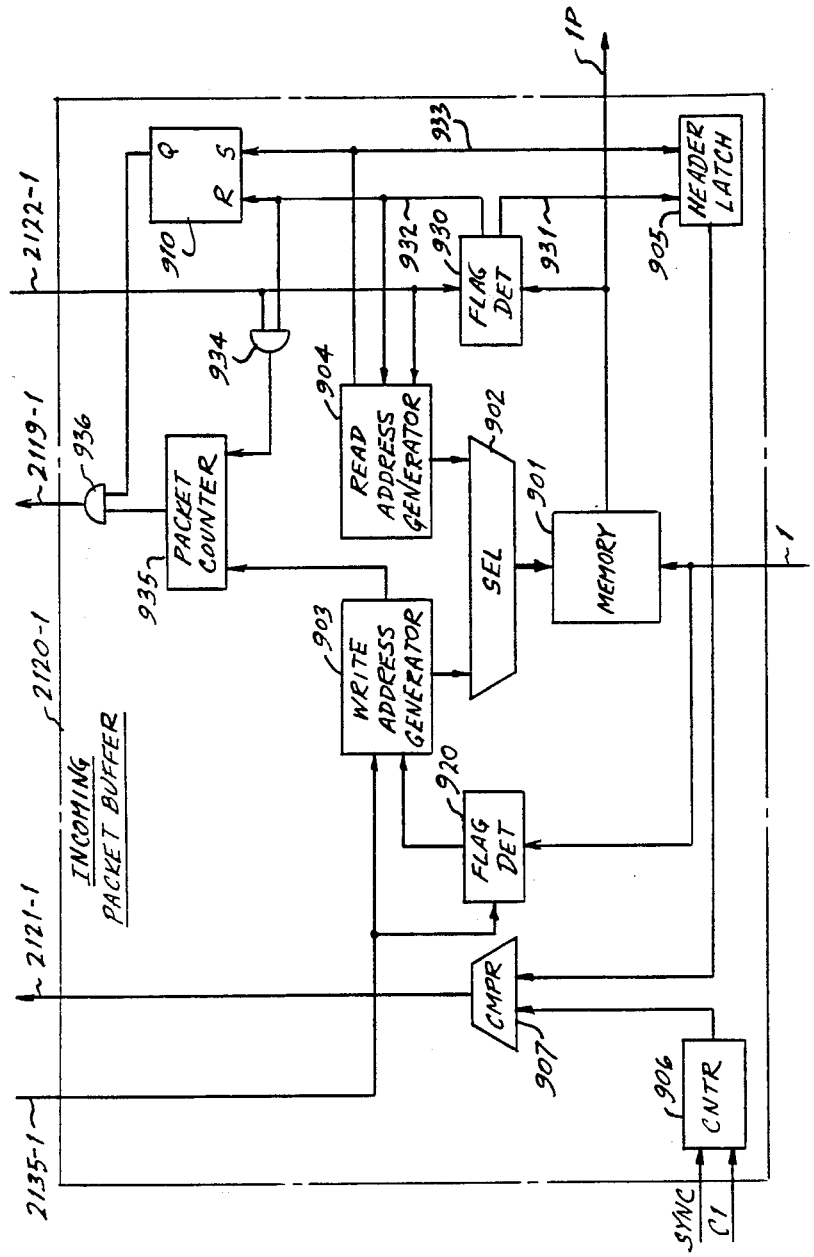
FIG. 9 is a diagram of an incoming packet buffer used for inter-module packet communication in the system of FIGS. 2 and 3.

Incoming packet buffer 2120-1 (FIG. 9) includes a memory 901 for storing bits received in the packet time slots on incoming link 15 to input port IP1. Such packets are conveyed to memory 901 via conductor 1. The writing and reading of memory 901 are controlled by a write address generator 903 and a read address generator 904, which selectively access memory 901 via a selector 902. Signals on conductor 2135-1 from control RAM 2132-1 define the input port IP1 packet time slots to write address generator 903 and to a flag detector 920, which detects the opening and closing flags of each received packet. When flag detector 920 informs write address generator 903 that an opening flag has been received, write address generator 903 effects the writing of the bits of the packet into memory 901. When flag detector 920 informs write address generator 901 that the closing flag has been received, write address generator controls the termination of writing into memory 901 and also increments by one a packet counter 935, used to count the number of packets stored in memory 901. After the complete packet has been stored, read address generator 904 effects the transmission of the initial bits of the packet to a flag detector 930, which upon detecting of the packet opening flag, controls the subsequent transmission of the module subfield of the packet header (with any inserted zero bits deleted) to a header latch 905. Read address generator 904 transmits a logic one signal on conductor 933 to cause the storage of the module subfield in latch 905 and to set a S-R flip-flop 910. An AND gate 936, which receives at its two input terminals the output signal from flip-flop 910 and a signal from packet counter 935 indicating that at least one packet is available in memory 901, then transmits the packet present signal on conductor 2119-1. A counter 906 receives a 32.768-megahertz clock signal C1 and an 8.0-kilohertz synchronizing signal SYNC from a system clock 2150. Counter 906 is a seven-bit counter which is incremented from 0000000 to 1111111 once during each cycle of control ring 2110. Counter 906 counts an internally delayed version of the synchronizing signal SYNC. The amount of internal delay depends on the position of incoming packet buffer 2120-1 with respect to control ring 2110. A comparator 907 compares the count present in counter 906 with the module subfield stored in header latch 905. When the count present in counter 906 is equal to the module subfield stored in header latch 905, comparator 907 transmits a logic one request pulse on a conductor 2121-1 to transmit control node 2123-1. When the module subfield defines switching module 1050, for example, as the packet destination, the request pulse transmitted by comparator 907 coincides with the presence on control ring 2110 at transmit control node 2123-1 of the status word defining the status of selector 2128-2.

When transmit control node 2123-1 returns a go signal on conductor 2122-1, the go signal is received by read address generator 904, which initiates the transmission of the packet (including the packet header) on conductor 1P. When flag detector 930 detects the packet closing flag, detector 930 transmits a stop signal on conductor 932 to reset flip-flop 910 such that the packet present signal on conductor 2119-1 is removed. An AND gate 934, which receives the stop signal on conductor 932 and the go signal on conductor 2122-1 at its two input terminals, transmits a logic one signal to packet counter 935 to decrement counter 935 by one to properly account for the transmitted packet. An additional counter (not shown) is used to assure that write address generator 903 does not overtake read address generator 904.

Figure 6:
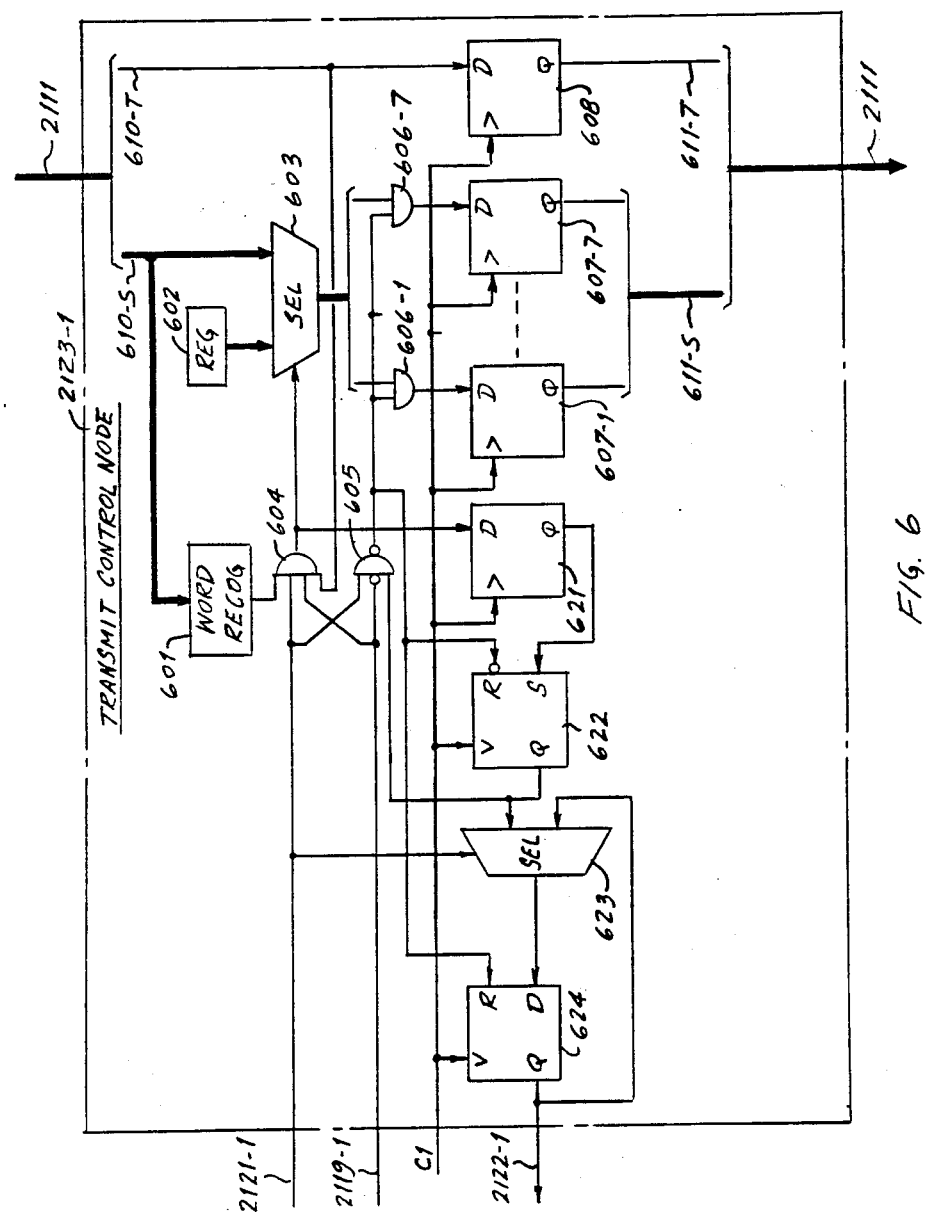
FIGS. 6 through 8 are diagrams of a transmit control node, a selector control node, and a ring repeater which are interconnected in a control ring as shown in FIG. 3.

Transmit control node 2123-1 (FIG. 6) includes a word recognition circuit 601 that receives the seven-conductor status bus 610-S of control ring 2110 and transmits a logic one signal to one input terminal of a four-input AND gate 604 whenever status bus 610-S defines the idle status word 0000000. The other three input terminals of AND gate 604 receive the request pulse and packet present signal on conductors 2121-1 and 2119-1 from incoming packet buffer 2120-1, and a throttle bit conductor 610-T of control ring 2110. Assume again that the request pulse defines selector 2128-2 associated with switching module 1050. AND gate 604 generates a logic one pulse coincident with the request pulse received on conductor 2121-1 only when: (1) the packet present signal is present on conductor 2119-1, (2) word recognition circuit 601 is generating a logic one indicating the presence of the idle status word 0000000 on status bus 610-S, and (3) the throttle bit associated with the idle status word 0000000 is a logic one indicating that outgoing packet buffer 2130-2 is presently able to receive a packet. Status bus 610-S is also received by a selector 603 which, in the absence of a logic one signal from AND gate 604, transmits the status word on status bus 610-S via AND gates 606-1 through 606-7 for storage in flip-flops 607-1 through 607-7. However, when AND gate 604 transmits a logic one signal, selector 603 instead transmits the status word stored in register 602 to AND gates 606-1 through 606-7 for storage in flip-flops 607-1 through 607-7. For transmit control node 2123-1, register 602 stores the status word 0000001 defining the associated input port IP1 and switching module 1000. Each status word and associated throttle bit stored by flip-flops 607-1 through 607-7 and 608 are subsequently transmitted via status bus 611-S and throttle bit conductor 611-T to control ring 2110 in response to the clock signal C1. The logic one pulse generated by AND gate 604 is also transmitted to a flip-flop 621, which in turn sets a S-R type flip-flop 622. A selector 623, which is controlled by the request pulse on conductor 2121-1, receives the Q output signal from flip-flop 622 and the Q output signal from a flip-flop 624. When the request pulse occurs again on conductor 2121-1 after the completion of a full ring cycle, the logic one signal generated at the Q output of flip-flop 622 is transmitted by selector 623 to be stored by flip-flop 624. Since the Q output of flip-flop 624 is returned to selector 623, it remains at a logic one level until flip-flop 624 is subsequently reset as described herein. The logic one level is transmitted as the go signal via conductor 2122-1 to incoming packet buffer 2120-1. The D and S-R flip-flops of transmit control node 2123-1 operate synchronously.

When incoming packet buffer 2120-1 completes the transmission of the packet, it removes the packet present signal on conductor 2119-1. Such removal is detected by a three-input NAND gate 605, which receives conductor 2119-1 at an inverting input terminal, and which receives the request pulses generated on conductor 2121-1 and the logic one signal generated by flip-flop 622 at its two non-inverting input terminals. When the packet present signal is removed on conductor 2119-1, NAND gate 605 transmits a logic zero pulse coincident with the next request pulse received on conductor 2121-1. The logic zero pulse transmitted by NAND gate 605 acts to reset flip-flops 622 and 624 such that they are ready to control the transmission of another packet. The logic zero pulse is also coupled to input terminals of the AND gates 606-1 through 606-7 such that the idle status word 0000000 is substituted for the status word 0000001 on status bus 611-S again defining selector 2128-2 as idle.

Figure 7:
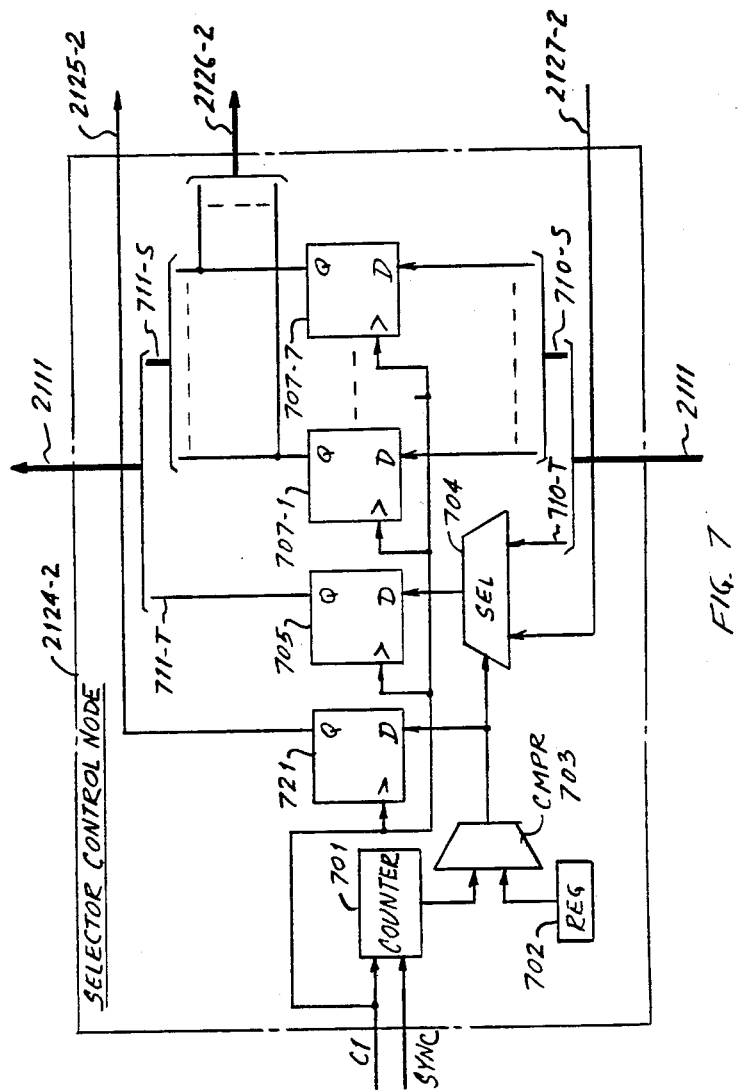

Selector control node 2124-2 (FIG. 7) receives via eight-conductor bus 2111 each status word and associated throttle bit from control ring 2110 on a status bus 710-S and a throttle bit conductor 710-T. The status words are stored in flip-flops 707-1 through 707-7 and subsequently transmitted in response to the clock signal C1. A seven-bit counter 701 receives the clock signal C1 and the synchronizing signal SYNC from system clock 2150 and is sequentially incremented from 0000000 to 1111111 once during each ring cycle. A comparator 703 compares the count generated by counter 701 with a seven-bit word stored in a register 702 defining the output port or switching module associated with that selector control node. In selector control node 2124-2, the word stored in register 702 is 1111110 defining the output port OP253 and the associated switching module 1050. Accordingly, comparator 703 generates a logic one strobe pulse which coincides with the presence on control ring 2110 at selector control node 2124-2 of the status word defining the status of selector 2128-2. The logic one strobe pulse is delayed by one cycle of clock signal C1 by a flip-flop 721 and is then transmitted on conductor 2125-2 to latch 2129-2 to effect the storage in latch 2129-2 of the status word on the output status bus 711-S from flip-flops 707-1 through 707-7. The throttle bit from outgoing packet buffer 2130-2 is transmitted via conductor 2127-2 to a selector 704 which also receives the throttle bit conductor 710-T from control ring 2110. The throttle bits from conductor 710-T are all transmitted by selector 704 to a flip-flop 705 with the exception of the throttle bit coinciding with the strobe pulse from comparator 703. When the strobe pulse is present, the throttle bit on conductor 2127-2 from outgoing packet buffer 2130-2 is instead transmitted to flip-flop 705 for subsequent transmission via conductor 711-T to control ring 2110. In this manner, a logic zero throttle bit from outgoing packet buffer 2130-2, which indicates that outgoing packet buffer 2130-2 is unable to receive a packet, is inserted on control ring 2110 in association with the status word defining the status of selector 2128-2.

Figure 8:
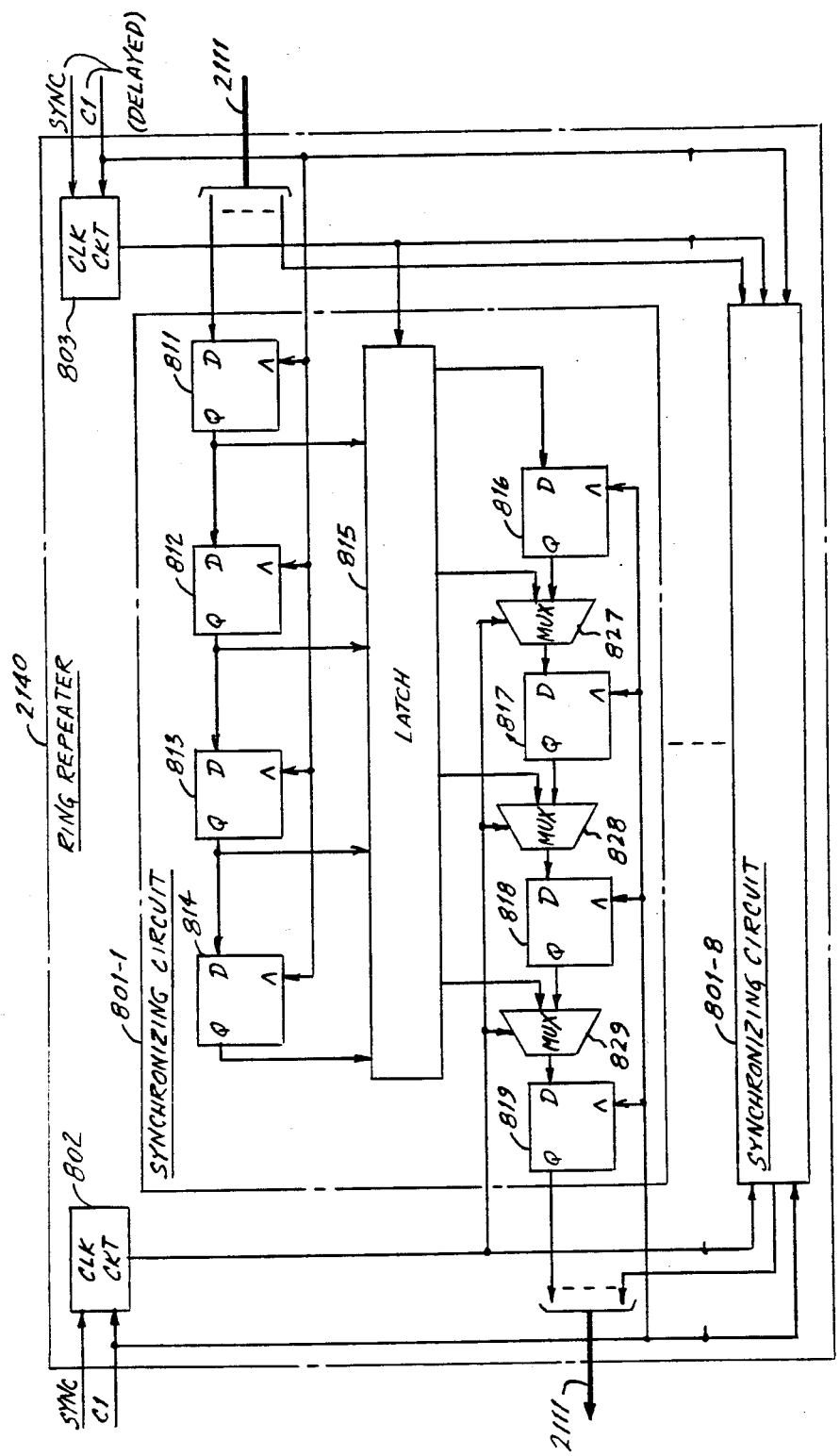

System clock 2150 (FIG. 3) derives its timing from an external source, e.g., another switching system, and distributes its 32.768-megahertz system clock signal C1 and its 8.0-kilohertz synchronizing signal SYNC via E-bus 2102 to the various components within TMS 2010. The clock signals are delayed as they traverse E-bus 2102. A ring repeater 2140 which joins the beginning of control ring 2110 with the end of control ring 2110 operates to resynchronize the status words and throttle bits received on the conductors of control ring 2110 as they begin their next cycle. Ring repeater 2140 (FIG. 8) includes eight synchronizing circuits 801-1 through 801-8, one for each conductor of bus 2111, and two clock circuits 802 and 803. Synchronizing circuit 801-1 includes four flip-flops 811 through 814 which sequentially receive and store four bits from a first conductor of bus 2111 in response to the delayed clock signal C1. The four bits stored in flip-flops 811 through 814 are simultaneously stored in a latch 815 in response to a clock signal derived by clock circuit 803 from the delayed clock and synchronizing signals, C1 and SYNC. The contents of latch 815 are subsequently transmitted in parallel to four flip-flops 816 through 819 in response to a clock signal derived by clock circuit 802 from the non-delayed clock and synchronizing signals C1 and SYNC. Multiplexers 827, 828, and 829 select either the parallel inputs from latch 815 for storage in flip-flops 817, 818 and 819 respectively, or the output signals from the preceding flip-flops 816, 817 and 818. The four bits stored in flip-flops 816 through 819 are sequentially transmitted on the first conductor of bus 2111 in response to the non-delayed clock signal C1. Seven additional synchronizing circuits, e.g., synchronizing circuit 801-8, perform the same function for the other seven conductors of bus 2111. Thus any timing skew which may result from the traversal of the signals around control ring 2110 is removed before the next ring cycle is initiated.

The call processing required to establish both circuit-switched calls and packet-switched calls within system 10 is performed cooperatively by the control units of the switching modules, e.g., control unit 1017 in switching module 1000, and by administrative module 2030. In the present embodiment, administrative module 2030 stores global data such as the available circuit-switched paths through time-multiplexed switch 2010. Recall that establishing a circuit-switched path between modules 1000 and 1050 involves selecting an available circuit-switched time slot on the links between modules 1000 and 1050 and time-multiplexed switch 2010. Administrative module 2030 stores the global data defining the availability of circuit-switched time slots to time-multiplexed switch 2010 and performs the selection of the time slot to be used for a given inter-module circuit-switched call. (A method where the time slot selection and all other call processing functions are cooperatively performed by the switching module control units without involving administrative module 2030 is disclosed in U.S. patent application No. 699,465 of S. Chang, filed on Feb. 7, 1985, and assigned to the assignee of the present application.) Administrative module 2030 also stores the data defining the association of protocol handlers, e.g., 1700-0, to user stations. Such data is used during the establishment of a packet-switched call to generate the required routing table entries in the protocol handlers associated with both the originating and terminating user stations. Although, administrative module 2030 is used to store such global data in the present embodiment, a switching module could also be used to store that data. In the latter case, all interprocessor communication needed for processing calls could be effected using the packet switching capability of time-multiplexed switch 2010 without involving message switch 2031 and administrative module 2030.

Recall that the establishment of an inter-module circuit-switched call in the present embodiment requires the selection of one time-multiplexed switch 2010 time slot. Time slot interchanger 410 in circuit switching unit 1011 (FIG. 4) is capable of looping back time slots used for intra-module circuit-switched calls. Even through intra-module call information is not conveyed on time-multiplexed lines 412 and 413, two time slots (one for each direction of transmission) on each of the lines 412 and 413 are made unavailable for conveying inter-module circuit-switched calls when a single intra-module call is established within time-slot interchanger 410. In the present embodiment, intra-module circuit-switched calls can be established such that the time slots made unavailable on lines 412 and 413 correspond to the predetermined packet time slots comprising the packet channel to time-multiplexed switch 2010. Whenever an intra-module circuit-switched call is being established, the time slot selections are made such that the time slots on lines 412 and 413 that are made unavailable correspond to two of the 64 packet time slots. Accordingly, up to 32 intra-module circuit-switched calls can be established within switching module 1000 without reducing the number of inter-module circuit-switched calls that can also be established.

What is claimed is:

1. A packet switch for switching packets received on a plurality of incoming packet channels to a plurality of outgoing packet channels, said packet switch comprising a plurality of packet buffers each for storing packets received from a least one of said incoming packet channels, a plurality of selectors each permanently connected to each of said packet buffers and each associated with at least one of said outgoing packet channels for selectively connecting any of said packet buffers to an outgoing packet channel associated with said each selector, means responsive to said stored packets for controlling the selective connections made by said selectors based on headers included in said stored packets, and means responsive to said stored packets for selectively effecting the transmission of said stored packets from said packet buffers, wherein said controlling means comprises a plurality of selector control nodes each for controlling the selective connections made by at least one of said selectors, and wherein said effecting means comprises a plurality of transmit control nodes for effecting the transmission of packets from at least one of said packet buffers, said packet switch further comprising a control ring comprising said transmit control nodes and said selector control nodes and means for interconnecting said transmit control nodes and said selector control nodes for transmitting signals to said transmit control nodes and said selector control nodes defining the present connection state of ones of said packet buffers to ones of said outgoing packet channels.

2. A packet switch in accordance with claim 1 wherein each of said transmit control nodes is responsive to a receipt by a packet buffer associated with said each transmit control node of a given packet, including a header defining a given one of said outgoing packet channels, and to signals transmitted by said interconnecting means defining a connection state wherein none of said packet buffers is presently connected to said given outgoing packet channel, for effecting a change of said signals transmitted by said interconnecting means to define a connection state wherein said packet buffer associated with said each transmit control node is connected to said given outgoing packet channel, and for effecting the transmission of said given packet from said packet buffer associated with said each transmit control node.

3. A packet switch in accordance with claim 2 wherein each of said selector control nodes is responsive to signals transmitted by said interconnecting means defining a connection state wherein a given packet buffer is connected to an outgoing packet channel associated with said each selector control node, for controlling the connection by a selector associated with said each selector control node of said given buffer to said outgoing packet channel associated with said each selector control node.

4. A packet switch for switching packets received on a plurality of incoming packet channels to a plurality of outgoing packet channels, said packet switch comprising
  a plurality of packet buffers each for storing packets received from at least one of said incoming packet channels,
  a plurality of selectors each permanently connected to each of said packet buffers and each associated with at least one of said outgoing packet channels for selectively connecting any of said packet buffers to an outgoing packet channel associated with said each selector,
  means responsive to said stored packets for controlling the selective connections made by said selectors based on headers included in said stored packets, and
  means responsive to said stored packets for selectively effecting the transmission of said stored packets from said packet buffers,
  wherein said controlling means comprises a plurality of selector control nodes each for controlling the selective connections made by at least one of said selectors, and
  wherein said effecting means comprises a plurality of transmit control nodes each for effecting the transmission of packets from at least one of said packet buffers,
  said packet switch further comprising a control ring comprising said transmit control nodes and said selector control nodes and means for interconnecting said transmit control nodes and said selector control nodes for transmitting signals to said transmit control nodes and said selector control nodes defining the availability of each of said outgoing packet channels for receiving packets and defining the present connection state of ones of said packet buffers to ones of said outgoing packet channels.

5. A packet switch in accordance with claim 4 wherein each of said transmit control nodes is responsive to a receipt by a packet buffer associated with said each transmit control node of a given packet, including a header defining a given one of said outgoing packet channels, and to signals transmitted by said interconnecting means defining that said given outgoing packet channel is available to receive packets and defining a connection state wherein none of said packet buffers is presently connected to said given outgoing packet channel, for effecting a change of said signals transmitted by said interconnecting means to define a connection state wherein said packet buffer associated with said each transmit control node is connected to said given outgoing packet channel, and for effecting the transmission of said given packet from said packet buffer associated with said given packet from said packet buffer associated with said each transmit control node.

6. A packet switch in accordance with claims 5 wherein each of said selector control nodes is responsive to signals transmitted by said interconnecting means defining a connection state wherein a given packet buffer is connected to an outgoing packet channel associated with said each selector control node, for controlling the connection by a selector associated with said each selector control node of said given packet buffer to said outgoing packet channel associated with said each selector control node.

7. A packet switch for switching packets received on a plurality of incoming packet channels to a plurality of outgoing packet channels, said packet switch comprising
  a plurality of packet buffers each for storing packets received from at least one of said incoming packet channels,
  a plurality of selectors each permanently connected to each of said packet buffers and each associated with at least one of said outgoing packet channels for selectively connecting any of said packet buffers to an outgoing packet channel associated with said each selector,
  means responsive to said stored packets for controlling the selective connections made by said selectors based on headers included in said stored packets, and
  a plurality of outgoing time-multiplexed links each for conveying a plurality of circuit-switched channels and at least one of said plurality of outgoing packet channels,
  wherein each of said outgoing packet channels comprises an outgoing packet buffer interposed between one of said selectors and one of said outgoing time-multiplexed links for storing packets received from said one of said selectors for insertion in said each outgoing packet channel conveyed on said one of said outgoing time-multiplexed links.

8. A packet switch for switching packets received by a plurality of incoming packet buffers to a plurality of outgoing packet buffers, said packet switch comprising
  a plurality of selectors each permanently connected to each of said incoming packet buffers and each associated with at least one of said outgoing packet buffers for selectively connecting any of said incoming packet buffers to an outgoing packet buffer associated with said each selector,
  means responsive to packets received by said incoming packet buffers for controlling the selective connections made by said selectors based on headers included in said received packets, and
  means responsive to said received packets for selectively effecting the transmission of said received packets from said incoming packet buffers,
  wherein said controlling means comprises a plurality of selector control nodes each for controlling the selective connections made by at least one of said selectors, and
  wherein said effecting means comprises a plurality of transmit control nodes each for effecting the transmission of packets from at least one of said incoming packet buffers,
  said packet switch further comprising a control ring comprising said transmit control nodes and said selector control nodes and means for interconnecting said transmit control nodes and said selector control nodes for transmitting signals to said transmit control nodes and said selector control nodes defining the present connection state of ones of said incoming packet buffers ones of said outgoing packet buffers.

9. A packet switch in accordance with claim 8 wherein each of said transmit control nodes is responsive to a receipt by an incoming packet buffer associated with said each transmit control node of a given packet, including a header defining a given one of said outgoing packet buffers, and to signals transmitted by said interconnecting means defining a connection state wherein none of said incoming packet buffers is presently connected to said given outgoing packet buffer, for effecting a change of said signals transmitted by said interconnecting means to define a connection state wherein said incoming packet buffer associated with said each transmit control node is connected to said given outgoing packet buffer, and for effecting the transmission of said given packet from said incoming packet buffer associated with said each transmit control node.

10. A packet switch in accordance with claim 9 wherein each of said selector control nodes is responsive to signals transmitted by said interconnecting means defining a connection state wherein a given incoming packet buffer is connected to an outgoing packet buffer associated with said selector control mode, for controlling the connection by a selector associated with said each selector control node of said given incoming packet buffer to said outgoing packet buffer associated with said each selector control node.

11. A packet switch for switching packets received by a plurality of incoming packet buffers to a plurality of outgoing packet buffers, said packet switch comprising a plurality of selectors each permanently connected to each of said incoming packet buffers and each associated with at least one of said outgoing packet buffers for selectively connecting any of said incoming packet buffers to an outgoing packet buffer associated with said each selector, means responsive to packets received by said incoming packet buffers for controlling the selective connections made by said selectors based on headers included in said received packets, and means responsive to said received packets for selectively effecting the transmission of said received packets from said incoming packet buffers, wherein said controlling means comprises a plurality of selector control nodes each for controlling the selective connections made by at least one of said selectors, and wherein said effecting means comprises a plurality of transmit control nodes each for effecting the transmission of packets from at least one of said incoming packet buffers, said packet switch further comprising a control ring comprising said transmit control nodes and said selector control nodes and means for interconnecting said transmit control nodes and said selector control nodes for transmitting signals to said transmit control nodes and said selector control nodes defining the availability of each of said outgoing packet buffers for receiving packets and defining the present connection state of ones of said incoming packet buffers to ones of said outgoing packet buffers.

12. A packet switch in accordance with claim 11 wherein each of said transmit control nodes is responsive to a receipt by an incoming packet buffer associated with said each transmit control node of a given packet, including a header defining a given one of said outgoing packet buffers, and to signals transmitted by said interconnecting means defining that said given outgoing packet buffer is available to receive packets and defining a connection state where in none of said incoming packet buffers is presently connected to said given outgoing packet buffer, for effecting a change of said signals transmitted by said interconnecting means to define a connection state wherein said incoming packet buffer associated with said each transmit control node is connected to said given outgoing packet buffer, and for effecting the transmission of said given packet from said incoming packet buffer associated with said each transmit control node.

13. A packet switch in accordance with claim 12 wherein each of said selector control nodes is responive to signals transmitted by said interconnecting means defining a connection state wherein a given incoming packet buffer is connected to an outgoing packet buffer associated with said each selector control node, for controlling the connection by a selector associated with said each selector control node of said given incoming packet buffer to said outgoing packet buffer associated with said each selector control node.

14. A packet switch for switching packets received on a plurality of incoming packet channels to a plurality of outgoing packet channels, said packet switch comprising a plurality of selectors each permanently connected to each of said incoming packet channels and each associated with at leat one of said outgoing packet channels for selectively connecting any of said incoming packet channels to an outgoing packet channel associated with said each selector, means responsive to packets received by said incoming packet channels for controlling the selective connections made by said selectors based on headers included in said received packets, and means responsive to said received packets for selectively effecting the transmission of said received packets from said incoming packet channels, wherein said controlling means comprises a plurality of selector control nodes each for controlling the selective connections made by at least one of said selectors, and wherein said effecting means comprises a plurality of transmit control nodes each for effecting the transmission of packets from at least one of said incoming packet channels, said packet switch further comprising a control ring comprising said transmit control nodes and said selector nodes and means for interconnecting said transmit control nodes and said selector control nodes for transmitting signals to saidd transmit control nodes and said selector control nodes defining the present connection state of ones of said incoming packet channels to ones of said outgoing packet channels.

15. A packet switch in accordance with claim 14 wherein each of said transmit control nodes is responsive to a receipt by an incoming packet channel associated with said each transmit control node of a given packet, including a header defining a given one of said outgoing packet channels, and to signals transmitted by said interconnecting means defining a connection state wherein none of said incoming packet channels is presently connected to said given outgoing packet channel, for effecting a change of said signals transmitted by said interconnecting means to define a connection state wherein said incoming packet channel associated with said each transmit control node is connected to said given outgoing packet channel, and for effecting the transmission of said given packet from said incoming packet channel associated with said each transmit control node.

16. A packet switch in accordance with claim 15 wherein each of said selector control nodes is responsive to signals transmitted by said interconnecting means defining a connection state wherein a given incoming packet channel is connected to an outgoing packet channel associated with said each selector control node, for controlling the connection by a selector associated with said each selector control node of said given incoming packet channel to said outgoing packet channel associated with said each selector control node.

17. A packet switch for switching packets received on a plurality of incoming packet channels to a plurality of outgoing packet channels, said packet switch comprising a plurality of selectors each permanently connected to each of said incoming packet channels and each associated with at least one of said outgoing packet channels for selectively connecting any of said incoming packet channels to an outgoing packet channel associated with said each selector, means responsive to packets received by said incoming packet channels for controlling the selective connections made by said selectors based on headers included in said received packets, and means responsive to said received packets for selectively effecting the transmission of said received packets from said incoming packet channels, wherein said controlling means comprises a plurality of selector control nodes each for controlling the selective connections made by at least one of said selectors, and wherein said effecting means comprises a plurality of transmit control nodes each for effecting the transmission of packets from at least one of said incoming packet channels, said packet switch further comprising a control ring comprising said transmit control nodes and said selector control nodes and means for interconnecting said transmit control nodes and said selector control nodes for transmitting signals to said transmit control nodes and said selector control nodes defining the availability of each of said outgoing packet channels for receiving packets and defining the present connection state of ones of said incoming packet channels to ones of said outgoing packet channels.

18. A packet switch in accordance with claim 17 wherein each of said transmit control nodes is responsive to a receipt by an incoming packet channel associated with said each transmit control node of a given packet, including a header defining a given one of said outgoing packet channels, and to signals transmitted by said interconnecting means defining that said given outgoing packet channel is available to receive packets and defining a connection state wherein none of said incoming packet channels is presently connected to said given outgoing packet channel, for effecting a change is said signals transmitted by said interconnecting means to define a connection state wherein said incoming packet channel associated with said each transmit control node is connected to said given outgoing packet channel, and for effecting the transmission of said given packet from said incoming packet channel associated with said each transmit control mode.

19. A packet switch in accordance with claim 18 wherein each of said selector control nodes is responsive to signals transmitted by said interconnecting means defining a connection state wherein a given incoming packet channel is connected to an outgoing packet channel associated with said each selector control node, for controlling the connection by a selector associated with said each selector control node of said given incoming packet channel to said outgoing packet channel associated with said each selector control node.

* * * * *

UNITED STATES PATENT AND TRADEMARK OFFICE
CERTIFICATE OF CORRECTION

PATENT NO. : 4,780,870

DATED : October 25, 1988

INVENTOR(S) : Christopher G. McHarg, David A. Pierce

It is certified that error appears in the above-identified patent and that said Letters Patent is hereby corrected as shown below:

IN THE CLAIMS

Column 18, line 19, "a" should be "at",
Column 18, line 39, after "nodes" insert --each--;
Column 19, line 5, "seIector" should be "selector",
Column 19, line 6, after "given" insert --packet--;
Column 20, line 67, after "buffers" insert --to--;
Column 21, line 22, after "said" insert --each--,
Column 21, line 23, "mode" should be "node";
Column 22, line 3, "where in" should be "wherein",
Column 22, line 29, "leat" should be "least",
Column 22, line 50, after "selector" insert --control--,
Column 22, line 52, "saidd" should be "said";
Column 24, line 22, "is" should be "of",
Column 24, line 29, "mode" should be "node".

Signed and Sealed this

Fifteenth Day of May, 1990

*Attest:*

HARRY F. MANBECK, JR.

*Attesting Officer*        *Commissioner of Patents and Trademarks*